United States Patent [19]
Gitlin et al.

[11] Patent Number: 5,159,445
[45] Date of Patent: Oct. 27, 1992

[54] TELECONFERENCING VIDEO DISPLAY SYSTEM FOR IMPROVING EYE CONTACT

[75] Inventors: Richard D. Gitlin, Little Silver; John F. Ribera, Howell; Clark Woodworth, Middletown, all of N.J.

[73] Assignee: AT&T Bell Laboratories, Murray Hill, N.J.

[21] Appl. No.: 636,324

[22] Filed: Dec. 31, 1990

[51] Int. Cl.⁵ ............................................. H04N 7/14
[52] U.S. Cl. .................................... 358/85; 379/53
[58] Field of Search ................. 358/85, 213.11, 86, 358/185, 181; 379/54, 53

[56] References Cited

U.S. PATENT DOCUMENTS

| | | | |
|---|---|---|---|
| 4,400,725 | 8/1983 | Tanigaki | 379/53 |
| 4,715,059 | 12/1987 | Cooper-Hart et al. | |
| 4,918,534 | 4/1990 | Lam et al. | |
| 4,928,301 | 5/1990 | Smoot | 358/85 |

FOREIGN PATENT DOCUMENTS 0119586 9/1981 Japan.
152387 11/1981 Japan.

Primary Examiner—James J. Groody
Assistant Examiner—Glenton B. Burgess
Attorney, Agent, or Firm—G. C. Ranieri

[57] ABSTRACT

Direct eye-to-eye contact and compactness are achieved in a video display system including a camera positioned behind, or opposite the viewing side of, a display screen having first and second modes of operation. As a result, the camera and the person or persons viewing the display are on opposite sides of the display screen. The display screen is controlled to switch from the first or image display mode to the second or substantially transparent mode. When the display screen is in the substantially transparent mode, the camera is controlled to record images appearing on the viewing side of the screen.

10 Claims, 2 Drawing Sheets

TELECONFERENCING VIDEO DISPLAY SYSTEM FOR IMPROVING EYE CONTACT

TECHNICAL FIELD

This invention relates to displays and, more particularly, to displays adapted for teleconferencing applications and the like wherein images of the calling and called persons viewing the displays are recorded and displayed on the called and calling displays, respectively.

BACKGROUND OF THE INVENTION

Teleconferencing was introduced decades ago in a simplified form with picture telephones wherein bidirectional video and audio links were established between calling and called parties. With the advent of personal, desktop computers, teleconferencing has assumed a more complex form. Digital images such as text and graphics are displayed on each conferees display terminal while video images of the conferees are also displayed in a portion of the display. The latter display is made possible by positioning a camera to one side (top, bottom, left, right) of the display screen for recording images of the particular conferee viewing the display terminal. Since the conferee focusses attention on the screen and because the camera is positioned off to one side of the screen, eye contact is lacking between the conferee and the associated camera. This is known as a problem of parallax—a problem which arises whenever a camera must view one or more persons watching a display screen. Parallax is also a problem in the broadcasting industry where text prompting devices are employed.

From the perspective of the camera suffering a parallax problem, the conferee appears to be dozing when the camera is above the screen, gazing to the left or right when the camera is right or left of the screen, or looking at the ceiling when the camera is below the screen. As the conferee's scrutiny of the screen display becomes more close, the problem of parallax becomes more noticeable. Eye contact with the camera establishes eye-to-eye contact with each of the conferees shown on the display screen thereby creating a feeling of interest among the conferees. Similarly, a lack of direct eye contact with the camera causes a lack of eye-to-eye contact with each of the conferees shown on the display screen which, in turn, creates a perception of disinterest or preoccupation.

While some teleconferencing display terminals continue to be produced with an inherent parallax problem, conventional solutions have been proposed. One such solution involves the combination of a CRT display with a side-mounted camera focussed on the conferee through a properly angled beam splitter. Each conferee can concentrate on the display screen while maintaining eye contact with the camera. Although such a display terminal conquers the parallax problem, it cannot be overlooked that the cost of success is quite high. This display terminal is extremely bulky covering an area several feet square. This is a significant percentage of a standard desk surface. Bulkiness is an inherent problem caused by the introduction of a beam splitter.

SUMMARY OF THE INVENTION

Direct eye-to-eye contact and compactness are achieved in a video display system including a camera positioned behind, or opposite the viewing side of, a display screen having first and second modes of operation. As a result, the camera and the person or persons viewing the display are on opposite sides of the display screen. The display screen is controlled to switch from the first or image display mode to the second or substantially transparent mode. When the display screen is in the substantially transparent mode, the camera is controlled to record images appearing on the viewing side of the screen.

Compactness results from the use of a flat panel display such as liquid crystal or plasma. Further size reductions are possible by employing charge-coupled device (CCD) image sensors in the camera.

For display screens requiring backlighting for viewing the displayed image, backlight illumination is provided together with the necessary control to extinguish or sufficiently lower the illumination level when the display screen is in the substantially transparent mode of operation. In another embodiment, a shutter provided between the camera lens and the display screen is controllably switched from a closed or reflective position to an open or transmissive position when the display screen enters the second mode of operation.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

Figure 1:
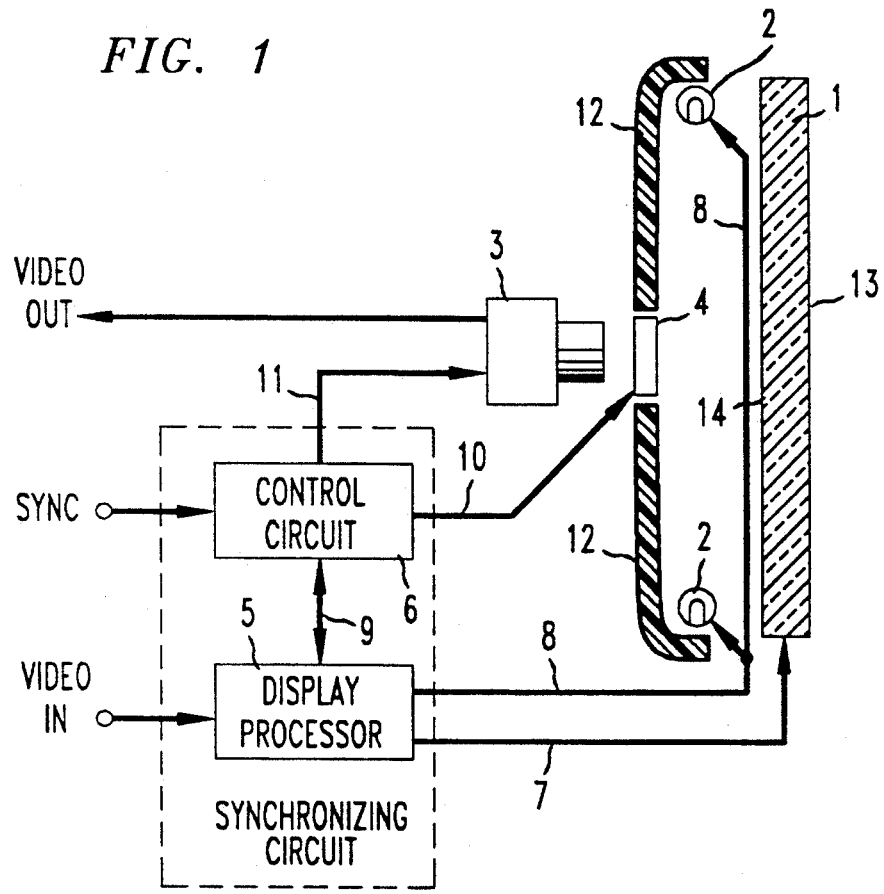
FIG. 1 is a simplified block diagram of a bidirectional video display system.

FIG. 1 shows an exemplary embodiment of the video display system realized in accordance with the principles of the invention. The display system comprises display 1, backlights 2, camera or image sensor 3, shutter 4, display processor 5, control circuit 6, and reflector 12.

Display 1 comprises a substantially flat panel display element which has a transparent mode of operation and an "on" mode of operation. During the "on" mode of operation, a person can view images depicted on the display through front surface 13. During the transparent mode of operation, display 1 is sufficiently clear to allow light to pass through the display to camera 3 thereby allowing camera 3 to record an image of the person or persons viewing the display.

Exemplary flat panel displays useful for realizing display 1 include liquid crystal displays, plasma displays and ferro-electric displays. In general, the display is arranged as an active matrix of rows and columns including an active device for providing high contrast (ON/OFF) at each cross point. The cross point or intersection between a particular row lead and particular column lead corresponds to a pixel which is activated by energizing the particular row and particular column leads. Active devices commonly used at the cross points include thin film transistors (TFT), p-i-n diodes, MIM diodes and plasma devices. The latter device is understood by those skilled in the art to be different from the plasma display mentioned above. Since liquid crystal displays are not light emitting types of devices, the display would normally require some form of backlighting as shown, for example, by backlights 2. It is contemplated that display 1 can provide monochrome, gray scale, or color display of the images. In an example from experimental practice, display 1 is realized as a TFT active matrix liquid crystal display such as the commercially available Sharp display model LQ14P01.

Display 1 receives video images for display together with control signals via a set of leads shown simply as lead 7 from display processor 5. In some applications, it may be desirable to permit the display to be written in one part of the frame with a video image and subsequently to decay in the remaining portion of the frame to its transparent mode. In other applications, it may be desirable to write an image rapidly on display 1 and then, at a later time within the frame period, switch the display to the transparent mode. Each pixel in display 1 is written or activated once per frame period. For the latter application above, a video image can be accumulated in a frame buffer (not shown) of display processor 5 so that the video image can be written to the pixels of display 1 within a small fraction of the frame period.

As shown in FIG. 1, camera 3 is mounted behind display 1. It is shown adjacent to, and spaced apart from, back surface 14 of display 1. The distance from the camera to the back surface of the display is determined by the type of image sensor employed and any auxiliary focussing apparatus employed. When display 1 is switched into the transparent mode by a signal on lead 7 from display processor 5, camera 3 receives a start signal on lead 11 from control circuit 6 to begin recording images of the person or persons viewing the display. The video output signal of the viewer images recorded by camera 3 is shown on the lead labeled VIDEO OUT.

In general, camera 3 is mounted in a sufficiently centralized position behind the display to view persons watching the display thereby eliminating parallax by maintaining direct eye contact between the camera and the viewers. Camera 3 must have sufficient lux sensitivity to maintain acceptable video output of viewers situated at a normal viewing distance from front surface 13 for display 1 when recording images in low levels of the available light. The transparency of display 1 and shutter 4 can be optimized to provide very little loss of available light. Exemplary embodiments of the video display system have been realized and operated in the transparent mode with commercially available video cameras such as Sony models XC-711 and XC-007 (low lux rating). Additionally, standard CCD sensor arrays may be employed together with appropriate lens or focussing apparatus. For a ⅔ inch CCD image sensing array, a 10–15 mm focal length lens apparatus provides adequate viewing quality of the person reading text from the display screen.

Synchronization between camera 3 and display 1 is maintained by a synchronizing circuit comprising display processor 5 and control circuit 6. The synchronizing circuit provides rapid time multiplexing between the transparent and "on" modes of display 1 to allow viewers to see the video images on display directly while permitting the camera to record images of the viewers. The synchronizing circuit receives video images destined for display 1 on a lead labeled VIDEO IN. Control circuit 6 develops fundamental synchronization from an externally supplied signal on the SYNC lead. Control circuit 6 utilizes standard circuits to manage operation of the camera and shutter. Display processor 5 converts the input video images to a form compatible with display 1. Since display processor 5 controls operation of display 1, it is convenient to have it also control operation of backlights 2.

A synchronization signal is externally supplied on the SYNC lead from either camera 3 or display processor 5 or another device external to the display system. This synchronization signal provides a reference for establishing timing intervals based upon either the beginning of a recording period by camera 3 or the beginning of a video image display period by display 1, for example. Coordination between control circuit 6 and display processor 5 is established by signals on lead 9. This coordination is needed to insure that (1) the shutter and camera operations are synchronized with the transparent mode for the display and (2) the illumination occurs during the image display mode or "on" mode of operation for display 1. Other aspects of the synchronizing circuit are described below in relation to additional elements in the video display system.

Duty cycles are defined, for camera 3, as the ratio between the time period for the transparent mode and the total frame period and, for display 1, as the time period for the "on" mode of display 1 and the total frame period. The duty cycle determines the relative light levels received by camera 3 and by a person viewing the display. In order to achieve acceptable contrast and brightness of displayed video images for a viewer, display 1 is maintained in the "on" mode for a sufficiently long period of time. Similarly, the display is be maintained in the transparent mode for a sufficient period of time to achieve proper light levels for the camera. Although a duty cycle of 50% is used in the examples described herein, it is contemplated that duty cycles other than 50% can be utilized. The frequency of mode switching for the display is determined by the display technology and the frame rate of the display. It is important to note that mode switching is generally synchronized with the display frame, camera operation depending on the persistence of the image sensor, operation of backlights, and operation of the shutter. Generally, the frame rate for the display is chosen to be 1/30 second and, in a 50% duty cycle environment, the display is in the "on" mode for 1/15 second and in the transparent mode for 1/15 second. The frame rate is defined above for non-interlaced frames on display 1. Where interlaced frames are desired, the rate of interest is the field rate wherein an odd and an even field comprise the frame.

Shutter 4 is an optional element shown interposed between the image sensor (camera 3) and back surface 14 of display 1. Shutter 4, when employed, is useful for obscuring display images which could reach the image sensor in the "on" mode and for obscuring the camera lens aperture in reflector 12. In the latter case, this provides a uniform backlighting surface because, in the absence of a shutter, an image of the open aperture could reach the viewer when display 1 is in the "on" mode. Shutter 4 is controlled to open and close by a signal on lead 10 from control circuit 6 of the synchronizing circuit. Shutter 4 remains open at least for the time period that camera 3 is recording images of the viewer through transparent display 1. Shutter 4 closes in response to a signal on lead 10 coincident with display 1 entering the "on" mode, thereby providing a uniform backlighting surface with reflector 12.

Typical shutters for use as shutter 4 include mechanical, optical and electrooptic effect devices. Mechanical shutters which permit electronic control provide sufficient blocking of the video images from the display to the image sensor but may lack the necessary speed of response in various applications. Optical and electrooptic effect devices suitable for use as shutter 4 include liquid crystal devices acting as polarizers and Kerr effect devices. These devices respond to an applied signal to switch to an optically non-transmissive state whereas the devices may be normally transmissive or transparent. The speed of response for each of these types of devices is well suited to the video display system described herein. Both latter devices are well known to those skilled in the art.

While the shutter is simple to implement, it may be advantageous to avoid the use of a shutter and run the image sensor at a speed twice the frame rate, that is, 1/15 second, where an exemplary standard frame rate is 1/30 second. In this type of operation, the image sensor generates a video output signal having the viewer images are interleaved with display images. By selectively writing only the viewer images into an output frame buffer (not shown), it is possible to read the images out from the output frame buffer at the standard frame rate. CCD image sensing arrays are commercially available and can be combined with appropriate well known circuits to perform the higher speed image sensing. Output frame buffering with different writing and reading speeds is also well known in the art.

Backlights 2 and reflective enclosure 12 provide illumination of display 1 so that video images on the display can be viewed with appropriate brightness levels and contrast. Backlights 2 are optional elements. Moreover, it is contemplated that the backlights may be kept on during operation of the video display system without interfering with the operation of the image sensor for camera 3. Operation of backlights 2 is controlled to be either on or switched on and off by a signal on lead 8 from display processor 5 of the synchronizing circuit. For switched operation, cold cathode lamps are suitable for use as backlights 2 located generally about the periphery of the display. Reflective enclosure 12 reflects the majority of light back toward the back surface of the display. The reflective enclosure includes a small aperture through which the camera and optional shutter view the display and viewers.

When backlight illumination of the display is employed, it may be desirable to reduce reflections from the back surface of display 1 toward camera 3. To this end, a standard antireflection coating or antireflection film can be applied to back surface 14.

Figure 2:
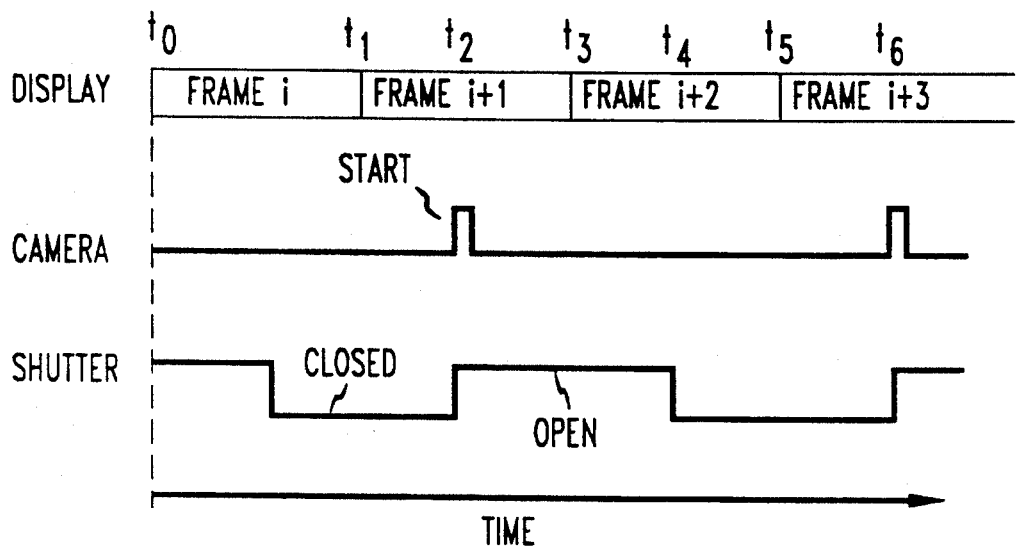
FIGS. 2 and 3 show exemplary timing diagrams for the video display system in FIG. 1.

FIG. 2 shows a simplified timing diagram for exemplary operation of the video display system shown in FIG. 1. Operation of only the display 1, image sensor or camera 3 and shutter 4 are considered in FIG. 2. Backlights 2 are assumed to be on. It should be noted that the displays are not interlaced in this example. The video image for frame i is sent to display 1 beginning at time $t_0$. The final pixel of the video image is written to the display at time $t_1$. Each pixel is allowed to decay during the time interval designated frame i+1 from time $t_1$ to time $t_3$. Since the camera is generally positioned along a central axis substantially normal to and centered on the display, it is necessary for the center portion of the display to become transparent before the camera begins operation. This occurs at time $t_2$ when the camera receives a start signal. Recording of the viewer image continues until time $t_4$, at which time the center pixels are again activated with another video display image for frame i+2. From time $t_2$ until time $t_4$, the shutter remains open. At time $t_3$, the next video display image is written to display 1. A similar sequence of events occurs in each successive frame period.

In this example, the video frame rate from the camera is twice the frame rate to the display because the images sensed by the camera are output while the shutter is open and while the shutter is closed. It is expected that this technique may produce unacceptable levels of flickering on the display.

For displays where the decay time to a transparent mode for individual pixels is one-half of a frame period or less, the display can be operated at a normal frame rate. That is, display 1 can display every video frame i, frame i+1, frame i+2, etc. In order to accomplish this, it is necessary to write the video image to the display from a device such as frame buffer. This permits the display to begin displaying the image almost instantaneously at the beginning of the frame period. By the middle of the frame period, the pixels begin to revert to a transparent mode. Recording of the viewer image commences three-quarters of the way through a frame period and continues through the first quarter of the next frame period.

Figure 3:
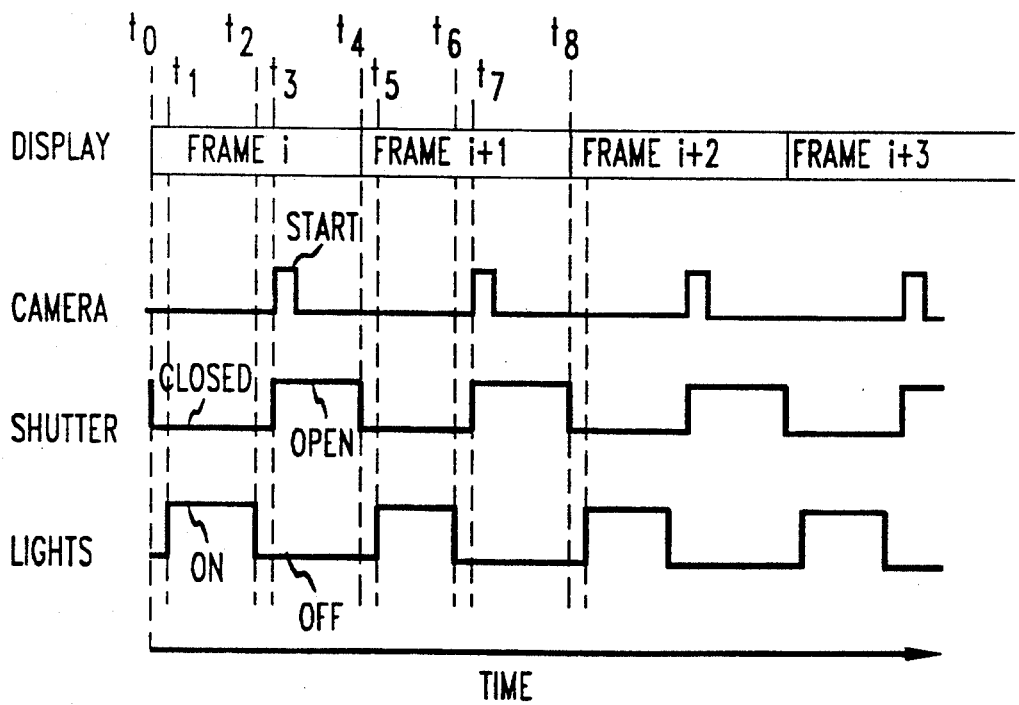

FIG. 3 shows a timing diagram for exemplary operation of the system in FIG. 1 wherein display 1 has the capability for being cleared to a transparent mode or wherein display 1 has the capability for individual pixels to decay rapidly into the transparent mode. The displays described above can have integral memory or separate frame buffers. In this example, the video display image is written to display 1 in the time period $t_0$ to $t_1$. From time $t_1$ to $t_2$, the display is actively $t_3$, the illumination is turned off. From time $t_2$ to $t_3$, the display is allowed to decay to a transparent mode. Alternatively, the display receives a signal from the synchronization circuit causing all pixels to switch to a transparent mode until frame i+1 is written to the display at time $t_4$. Once the display is in the transparent mode at time $t_3$, the camera is activated by the start signal and the shutter is opened to allow recording of the viewer images. A similar sequence of events occurs in each successive frame period. By maintaining the writing period ($t_0$ to $t_1$) and the clearing period ($t_2$ to $t_3$) as small as possible, light loss is minimized.

For the example shown in FIG. 3, ferroelectric displays are attractive because they can be written rapidly and they retain the video image after writing. Switching this type of display to the transparent state is accomplished by rewriting the entire display or by clearing the display with the proper control signal.

We claim:

1. A display system for providing video images to a viewer and for collecting images of the viewer, the system comprising, display means having first and second controllable modes of operation, the display means having a front and back surfaces, the front surface for viewing the video images, image sensing means for generating a video representation of the viewer image, the image sensing means being located adjacent to the back surface of the display means, synchronizing means connected to said display means for controlling the display means to switch to the first controllable mode of operation during a first time interval so that the video image is display by the display means, said synchronizing means for controlling the display means to switch to the second controllable mode of operation during a second time interval so that viewer images are recorded by the image sensing means through the display means, illumination means positioned adjacent to the back surface of the display means for backlighting the display means, the illumination means being switchably controllable to an "ON" state and to an "OFF" state, and the synchronizing means connected to the illumination means for controlling the illumination means to switch to the "ON" state during substantially the first time interval, the synchronizing means for controlling the illumination means to switch to the "OFF" state during substantially the second time interval, said second time interval being substantially equal to at least one-fourth of the sum of the first and second time intervals.

2. The display system as defined in claim 1 wherein the display means comprises a substantially flat panel display.

3. The display system as defined in claim 2 wherein the substantially flat panel display is of the type selected from the group consisting of liquid crystal, plasma, and ferro-electric displays.

4. The display system as defined in claim 1 wherein the image sensing means includes a video camera.

5. The display system as defined in claim 1 wherein the image sensing means includes a charge-coupled device array.

6. The display system as defined in claim 1 wherein the display system further includes a frame buffer for storing a next video image the frame buffer responsive to the synchronizing means for transferring the stored next video image to the display means substantially at the beginning of the first time interval.

7. The display system as defined in claim 1 further comprising, shutter means interposed between the image sensing means and the back surface of the display means and having first and second modes of operation, the first mode of operation for scattering light impinging thereon and the second mode of operation for transmitting light therethrough so that images are transmitted to the image sensing means, and the synchronizing means connected to the shutter means for controlling the shutter means to switch to the first mode of operation during the first time interval, and the synchronizing means for controlling the shutter means to switch to the second mode of operation during the second time interval.

8. The display system as defined in claim 7 wherein the shutter means includes an electrooptic device.

9. The display system as defined in claim 8 wherein the electrooptic device is a Kerr cell.

10. The display device as defined in claim 7 wherein the shutter means includes a liquid crystal cell.

* * * * *